US011279634B2

United States Patent
Oinuma et al.

(10) Patent No.: US 11,279,634 B2
(45) Date of Patent: Mar. 22, 2022

(54) WATER TREATMENT DEVICE AND WATER TREATMENT METHOD

(71) Applicant: Mitsubishi Electric Corporation, Chiyoda-ku (JP)

(72) Inventors: Gaku Oinuma, Chiyoda-ku (JP); Teruki Naito, Chiyoda-ku (JP); Yu Kamiya, Chiyoda-ku (JP); Yasutaka Inanaga, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/967,885

(22) PCT Filed: Mar. 14, 2018

(86) PCT No.: PCT/JP2018/009863
§ 371 (c)(1),
(2) Date: Aug. 6, 2020

(87) PCT Pub. No.: WO2019/175998
PCT Pub. Date: Sep. 19, 2019

(65) Prior Publication Data
US 2020/0385290 A1 Dec. 10, 2020

(51) Int. Cl.
*C02F 1/46* (2006.01)
*C02F 1/00* (2006.01)
*C02F 1/48* (2006.01)

(52) U.S. Cl.
CPC ............ *C02F 1/4608* (2013.01); *C02F 1/006* (2013.01); *C02F 1/48* (2013.01); *C02F 2305/023* (2013.01)

(58) Field of Classification Search
CPC .. C02F 1/467; C02F 1/00; C02F 1/461; A47L 15/42; D06F 35/00; D06F 39/10
See application file for complete search history.

(56) References Cited

U.S. PATENT DOCUMENTS

2008/0302663 A1* 12/2008 Jarvis ..................... B03C 11/00
204/556
2019/0031539 A1 1/2019 Naito et al.

FOREIGN PATENT DOCUMENTS

| JP | 2010-234187 A | 10/2010 |
| WO | WO 2014/188078 A1 | 11/2014 |
| WO | WO 2017/094301 A1 | 6/2017 |

OTHER PUBLICATIONS

International Search Report dated May 15, 2018 in PCT/JP2018/009863 filed on Mar. 14, 2018, 2 pages.

* cited by examiner

*Primary Examiner* — Walter D. Griffin
*Assistant Examiner* — Cameron J Allen
(74) *Attorney, Agent, or Firm* — Xsensus LLP

(57) ABSTRACT

A water treatment device includes, between at least two flat sheet-shaped grounded electrodes vertically disposed so as to be parallel to each other, a sheet-shaped high-voltage electrode having two edges opposing the respective grounded electrodes. The sheet-shaped high-voltage electrode is supported by a plurality of support members, and thus deformation of the high-voltage electrode in an up/down direction and a horizontal direction is suppressed, and the distance between each edge of the high-voltage electrode and the corresponding grounded electrode, i.e., an electric discharge gap length, can be kept even. Accordingly, uniform electric discharge can be maintained between the high-voltage electrode and the grounded electrode, whereby highly efficient water treatment can be realized.

20 Claims, 11 Drawing Sheets

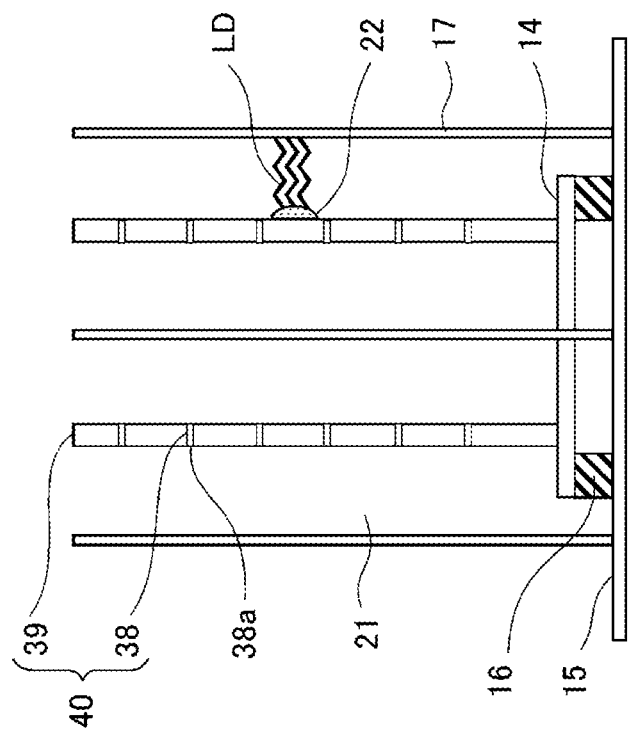
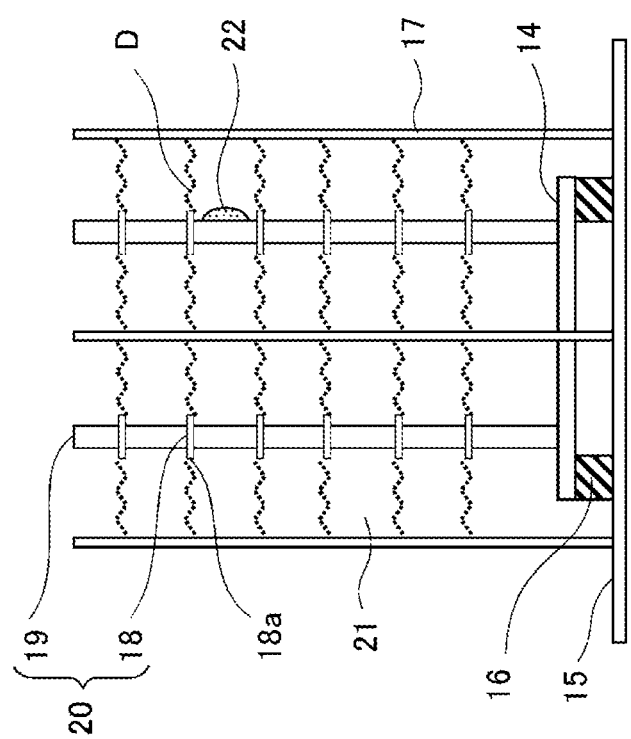
FIG. 6A
FIG. 6B

WATER TREATMENT DEVICE AND WATER TREATMENT METHOD

TECHNICAL FIELD

The present disclosure relates to a water treatment device and a water treatment method for treating treatment target water by using ozone, radicals, and the like generated by electric discharge.

BACKGROUND ART

Industrial waste water and the like may contain persistent substances that are not decomposed by existing ozone treatment devices. In particular, removal of dioxins, dioxane, and the like has been a significant issue. In view of this, methods have been proposed in which hydroxyl radicals (hereinafter, referred to as "OH radicals") having higher activity than ozone are generated by electric discharge and caused to act on treatment target water, thereby removing persistent substances.

For example, Patent Document 1 discloses a water treatment device in which a plurality of wire-shaped high-voltage electrodes retained in the horizontal direction are disposed between two vertically disposed sheet-shaped grounded electrodes, and which is configured such that voltage is applied to form short-pulsed electric discharge between both electrodes. In the conventional technology, both ends of each wire-shaped high-voltage electrode are connected to a treatment tank via insulating members, and treatment target water is supplied in a shower from an upper portion of the treatment tank.

CITATION LIST

Patent Document

Patent Document 1: WO2014/188078A1

SUMMARY OF THE INVENTION

Problems to be Solved by the Invention

The wire-shaped high-voltage electrodes as disclosed in Patent Document 1 are easily deformed in the up/down direction and the horizontal direction when being disposed in the treatment tank. This deformation makes it difficult to retain each wire-shaped high-voltage electrode such that the distance therefrom to each grounded electrode, i.e., an electric discharge gap length, becomes even. In order to suppress the deformation of the high-voltage electrodes, it is necessary to retain the high-voltage electrodes while applying tensile stress to both ends thereof. However, excessive tensile stress results in breakage of the wires. Therefore, attention should be paid to tensile stress. In addition, the wire-shaped high-voltage electrodes have a problem of being deformed also by loosening of a retaining portion owing to a long-term operation, extension of the wire material, or the like, whereby unevenness in the electric discharge gap length increases. If non-uniformity in electric discharge occurs, the area of contact between electric discharge and the treatment target water decreases, whereby the efficiency of water treatment decreases.

Furthermore, the wire-shaped high-voltage electrodes are easily broken because of degradation of the material thereof owing to a long-term operation or because of occurrence of local intense electric discharge. A broken wire droops from the connected portions thereof to come into contact with or come close to the treatment tank or the grounded electrodes. Accordingly, short circuiting and localization of electric discharge occur. Thus, when a wire is broken, a problem arises in that the device needs to be stopped for repairing the electrode, whereby the operation rate of the device decreases.

The present disclosure has been made in view of the above-described problems, and an object of the present disclosure is to provide a water treatment device that suppresses deformation and breakage of a high-voltage electrode and localization of electric discharge and that has a high efficiency of water treatment and a high operation rate. In addition, another object of the present disclosure is to provide a water treatment method that enables suppression of deformation and breakage of a high-voltage electrode and localization of electric discharge.

Solution to the Problems

A water treatment device according to the present disclosure includes: at least two grounded electrodes disposed inside a treatment tank so as to oppose each other; a sheet-shaped high-voltage electrode disposed between the grounded electrodes; a support member supporting the high-voltage electrode; and a water sprinkling portion which sprinkles treatment target water at least between the grounded electrodes. The high-voltage electrode has two edges opposing the respective grounded electrodes and is disposed such that distances between the edges and the respective grounded electrodes opposing thereto are equal to each other. Electric discharge is generated to form an electric discharge region, between each grounded electrode and the corresponding edges of the high-voltage electrode, and treatment target water is caused to pass through the electric discharge region.

A water treatment method according to the present disclosure includes: a step of disposing, between at least two flat sheet-shaped grounded electrodes vertically disposed so as to be parallel to each other, a sheet-shaped high-voltage electrode having two edges opposing the respective grounded electrodes, such that distances between the edges and the respective grounded electrodes opposing thereto are equal to each other; a step of applying voltage to the high-voltage electrode so as to generate electric discharge to form an electric discharge region, between each grounded electrode and the corresponding edge of the high-voltage electrode; and a step of sprinkling treatment target water between the grounded electrodes and causing the treatment target water to pass through the electric discharge region so as to bring the treatment target water into contact with the electric discharge, to treat the treatment target water.

Effect of the Invention

The water treatment device according to the present disclosure includes the sheet-shaped high-voltage electrode, and thus deformation and breakage of the high-voltage electrode, and localization of electric discharge, are suppressed, whereby uniform electric discharge can be maintained between the grounded electrode and the edge of the high-voltage electrode, and highly efficient water treatment can be realized. In addition, the frequency of repair of the high-voltage electrode decreases, and thus the operation rate is improved.

The water treatment method according to the present disclosure uses the sheet-shaped high-voltage electrode, and thus deformation and breakage of the high-voltage electrode, and localization of electric discharge, are suppressed, whereby uniform electric discharge can be maintained between the grounded electrode and the edge of the high-voltage electrode, and highly efficient water treatment can be realized.

Objects, features, viewpoints, and effects of the present disclosure other than the above-described ones will be more clarified from the following detailed description made with reference to the drawings.

BRIEF DESCRIPTION OF THE DRAWINGS

FIG. 6A is a diagram showing the electrode portion of the water treatment device according to embodiment 1, and FIG. 6B is a diagram showing an electrode portion of a water treatment device according to a comparative example.

DESCRIPTION OF EMBODIMENTS

Embodiment 1

Figure 1:
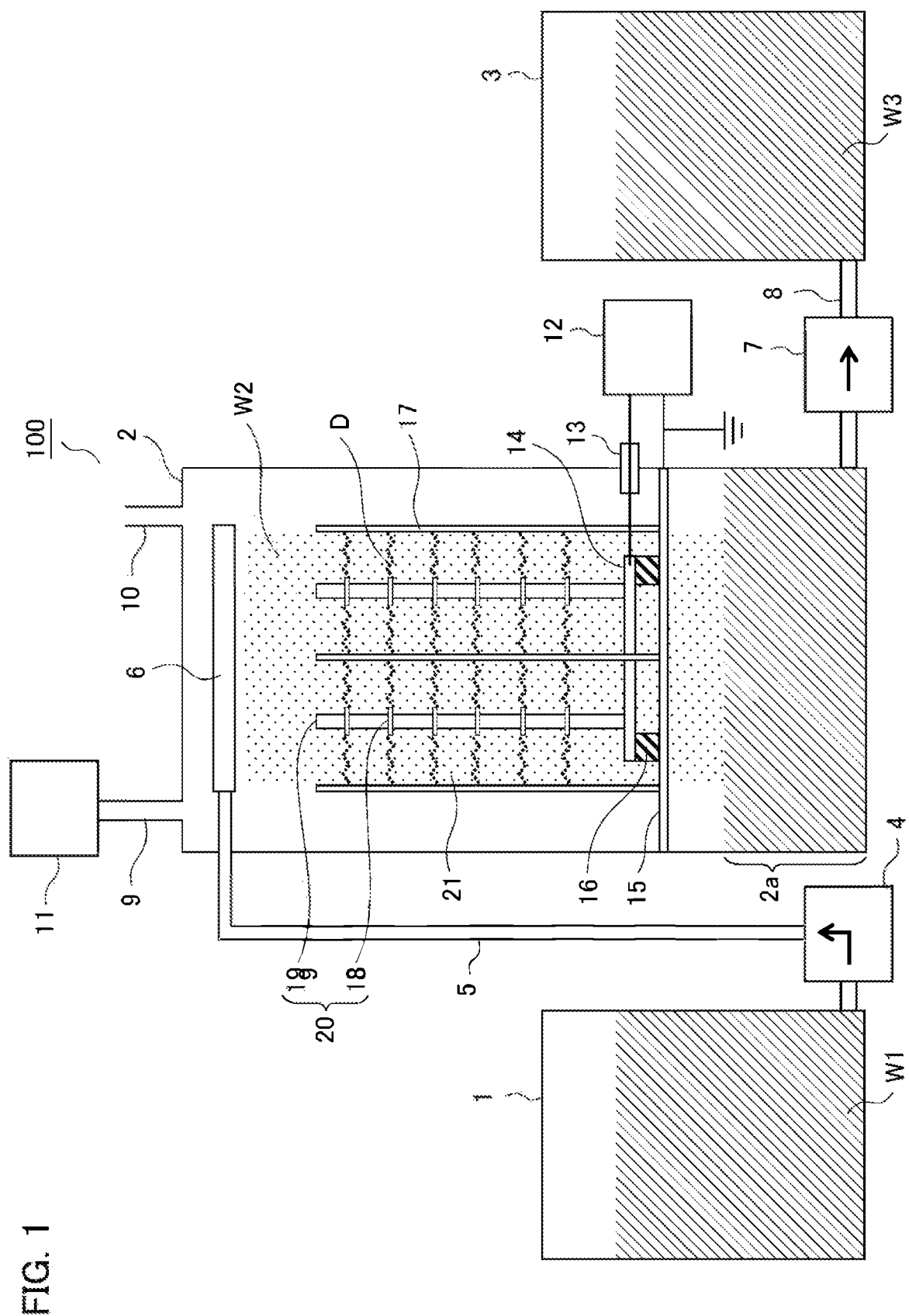
FIG. 1 is a schematic diagram showing the entire configuration of a water treatment device according to embodiment 1.
Figure 2:
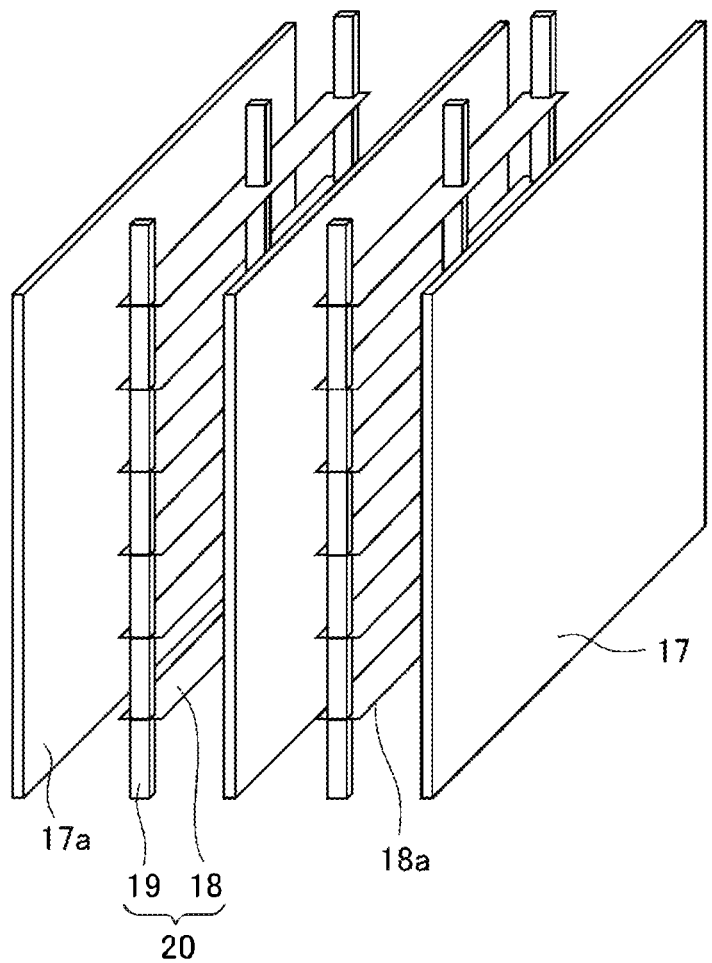
FIG. 2 is a perspective view of an electrode portion of the water treatment device according to embodiment 1.
Figure 3:
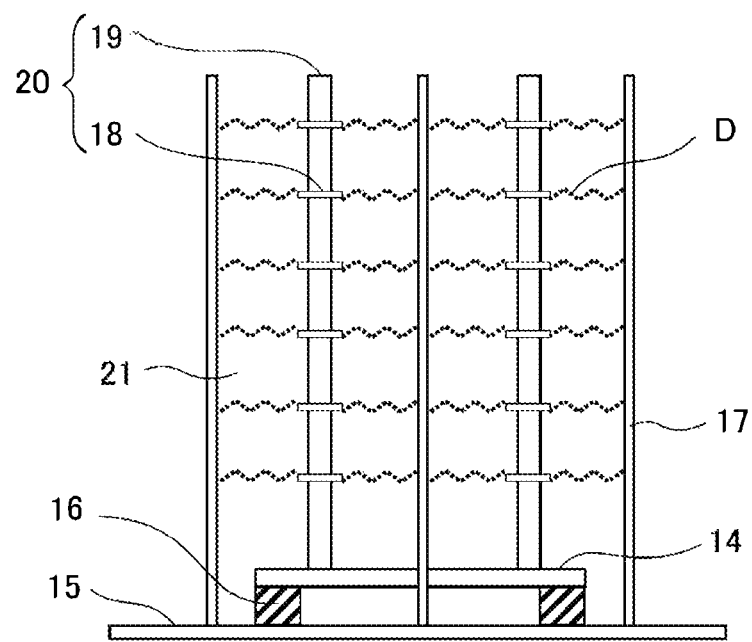
FIG. 3 is a side view of the electrode portion of the water treatment device according to embodiment 1.
Figure 4:
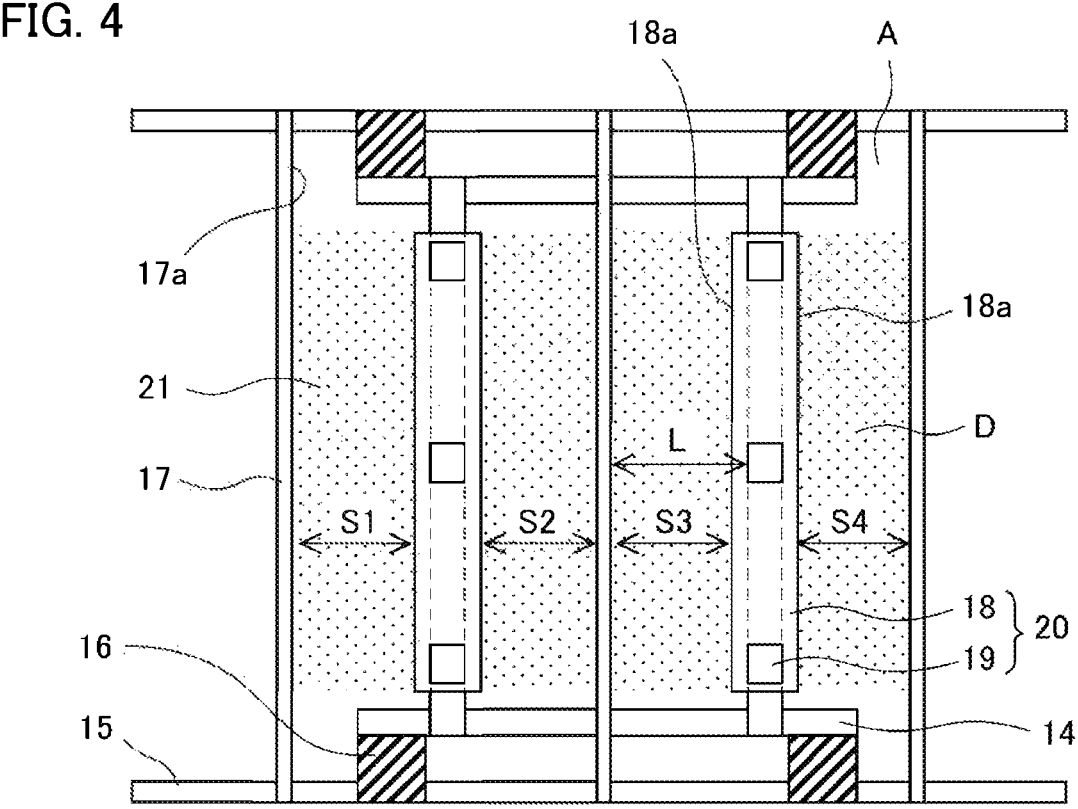
FIG. 4 is a top view of the electrode portion of the water treatment device according to embodiment 1.

Hereinafter, a water treatment device and a water treatment method according to embodiment 1 of the present disclosure will be described with reference to the drawings. FIG. 1 is a schematic diagram showing the entire configuration of the water treatment device according to embodiment 1. FIG. 2, FIG. 3, and FIG. 4 are respectively a perspective view, a side view, and a top view of an electrode portion of the water treatment device according to embodiment 1. In the drawings, identical and corresponding portions are denoted by the same reference characters. A water treatment device 100 according to the present embodiment 1 includes: an untreated water storing tank 1 for storing untreated water W1; a treatment tank 2 in which treatment target water W2 is treated; and a treated water storing tank 3 for storing treated water W3.

In the following description, the untreated water W1 refers to water that has not yet been conveyed into the treatment tank 2, and examples of the water include industrial waste water to be treated. The treatment target water W2 refers to water that is present in the treatment tank 2, and the treated water W3 refers to water having passed through the treatment tank 2.

The water treatment device 100 includes a water supply pump 4 and a water supply pipe 5 as untreated water delivery means for delivering, to the treatment tank 2, untreated water W1 stored in the untreated water storing tank 1. One end of the water supply pipe 5 is connected to a portion, of the untreated water storing tank 1, that is near the bottom thereof, and the other end of the water supply pipe 5 is connected to a water sprinkling pipe 6 serving as a water sprinkling portion disposed at an upper portion of the inside of the treatment, tank 2. The water sprinkling pipe 6 is obtained by forming a plurality of pores in a side surface of a tubular pipe, and sprinkles the treatment target water W2 in the form of liquid droplets at least between grounded electrodes 17.

The water treatment device 100 further includes a water discharge pump 7 and a water discharge pipe 8 as discharge means for discharging the treatment target water W2 from an accumulation portion 2a at a bottom portion of the treatment tank 2. One end of the water discharge pipe 8 is connected to the accumulation portion 2a of the treatment tank 2, and the other end of the water discharge pipe 8 is connected to the treated water storing tank 3.

The water treatment device 100 further includes gas supply means for filling the inside of the treatment tank 2 with a high-concentration oxygen atmosphere. Specifically, a gas supply port 9 and a gas discharge port 10 are provided in the top of the treatment tank 2, and a gas supply source 11 is connected to the gas supply port 9. The gas to be supplied into the treatment tank 2 is not limited to oxygen gas, and only has to contain oxygen gas. For example, air or a gas that is obtained by mixing nitrogen or a rare gas with oxygen in an arbitrary ratio, can be used. In particular, if a rare gas such as argon or neon is used, electric discharge can be stably formed also at a relatively low voltage. Meanwhile, if air is used, cost for gas can be significantly reduced.

A high-voltage output terminal of a pulsed power supply 12 is connected to a high-voltage frame 14 via an insulating member 13. The treatment tank 2 and a ground-side terminal of the pulsed power supply 12 are each electrically grounded. The high-voltage frame 14 and a grounded frame 15 are horizontally disposed inside the treatment tank 2. The high-voltage frame 14 is connected to the grounded frame 15 via insulation retaining members 16, and the grounded frame 15 is connected to the treatment tank 2.

As shown in FIG. 2 and FIG. 3, the electrode portion disposed inside the treatment tank 2 includes: three flat sheet-shaped grounded electrodes 17 vertically disposed so as to be parallel to one another; and two sets of high-voltage electrode units 20 disposed between the grounded electrodes 17. The grounded electrodes 17 are connected to the grounded frame 15, and the high-voltage electrode units 20 are connected to the high-voltage frame 14. The three grounded electrodes 17 are arranged at equal intervals, and each high-voltage electrode unit 20 is disposed at an intermediate position between two of the grounded electrodes 17 that are disposed so as to oppose each other.

Each high-voltage electrode unit 20 is composed of sheet-shaped high-voltage electrodes 18 and support members 19 supporting the high-voltage electrodes 18. In the present embodiment 1, the high-voltage electrode unit 20 includes six high-voltage electrodes 18 as rectangular flat sheets and three vertically standing support members 19. The six high-voltage electrodes 18 arranged at predetermined intervals from each other in the vertical direction are integrally supported by the three support members 19. In the example shown in FIG. 2, the support members 19 have prismatic shapes, are arranged at intervals from each other in the longitudinal direction of the high-voltage electrodes 18, and support each high-voltage electrode 18 horizontally.

In addition, as shown in FIG. 4, the six high-voltage electrodes 18 are arranged so as to be stacked on each other in the vertical direction and thus overlap with each other as seen from above. Each high-voltage electrode 18 has two edges 18a opposing the respective grounded electrodes 17 and is disposed such that the distances between the edges 18a and the respective grounded electrodes 17 opposing thereto are equal to each other. The distances S1, S2, S3, and S4 (collectively referred to as "distance S") between the grounded electrodes 17 and the high-voltage electrodes 18 are equal to one another.

Furthermore, the high-voltage electrodes 18 and the support members 19 composing the high-voltage electrode unit 20 are, as seen from above, disposed on the inside (region indicated by "A" in FIG. 4) of a rectangle, two sides of which are formed by two of the grounded electrodes 17. That is, the dimension in the longitudinal direction of each high-voltage electrode 18 (in the present embodiment 1, the length of each edge 18a) is smaller than the dimension in the horizontal direction of the corresponding grounded electrode 17. The distance S between each edges 18a of the high-voltage electrode 18 and the corresponding grounded electrode 17 is shorter than the distance L between each support member 19 and the corresponding grounded electrode 17.

The water treatment device 100 generates electric discharge D to form an electric discharge region 21 between each edge 18a of the high-voltage electrode 18 and the corresponding grounded electrode 17. The treatment target water W2 is treated by causing the treatment target water W2 to pass through the electric discharge region 21. In the present embodiment 1, the water sprinkling pipe 6 is disposed at the upper portion of the inside of the treatment tank 2 and sprinkles the treatment target water W2 downward. Thus, the treatment target water W2 is dropped through the electric discharge region 21.

Figure 5B:
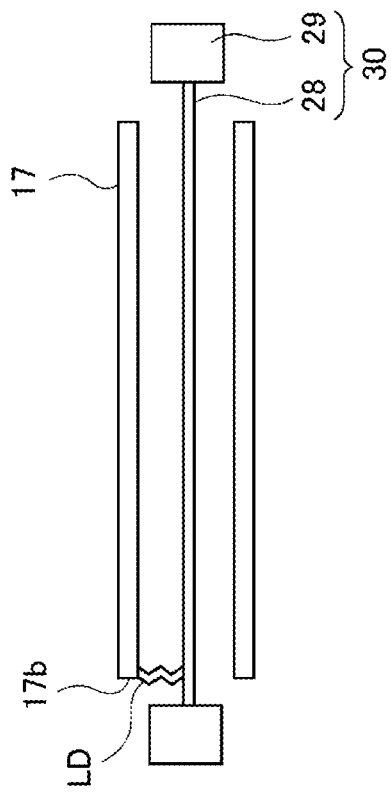
FIG. 5B is a diagram showing an electrode portion of a water treatment device according to a comparative example.
Figure 5A:
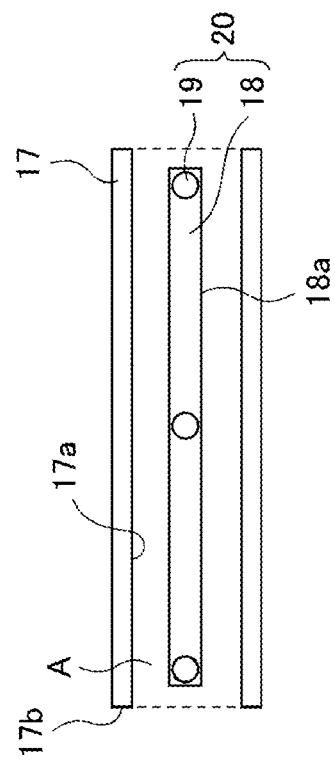
FIG. 5A is a diagram showing the electrode portion of the water treatment device according to embodiment 1.

Features of the water treatment device 100 including the electrode portion configured as described above will be described with use of a comparative example. FIG. 5A is a top view of the electrode portion of the water treatment device according to the present embodiment 1. FIG. 5B is a top view of an electrode portion of a water treatment device according to a comparative example. The high-voltage electrode unit 20 in the present embodiment 1 shown in FIG. 5A has the support members 19 which have columnar shapes.

As shown in FIG. 5A, in the high-voltage electrode unit 20 of the water treatment device 100, the dimension in the longitudinal direction of each high-voltage electrode 18, i.e., the length of each edge 18a, is smaller than the dimension in the horizontal direction of the flat surface portion 17a of the corresponding grounded electrode 17. Therefore, the high-voltage electrode 18 is not present at positions that oppose ends 17h of the grounded electrode 17. Accordingly, localization of electric discharge due to electric field enhancement at the ends 17h of the grounded electrode 17 is suppressed, and thus uniform electric discharge is formed between each edge 18a of the high-voltage electrode 18 and the corresponding grounded electrode 17.

In contrast, in a high-voltage electrode unit 30 in the comparative example shown in FIG. 5B, both ends of a high-voltage electrode 28 are supported by support members 29, and the dimension in the longitudinal direction of the high-voltage electrode 28 is larger than the dimension in the horizontal direction of the grounded electrode 17. Therefore, the high-voltage electrode 28 is present at the positions that oppose the ends 17b of the grounded electrode 17. Accordingly, local intense electric discharge LD is generated owing to electric field enhancement at the ends 17h of the grounded electrode 17, and thus no uniform electric discharge is formed.

FIG. 6A is a side view of the electrode portion of the water treatment device according to the present embodiment 1. FIG. 6B is a side view of an electrode portion of a water treatment device according to a comparative example. As shown in FIG. 6A, in the water treatment device 100, the distance between each edge 18a of the high-voltage electrode 18 and the corresponding grounded electrode 17 is shorter than the distance between each support member 19 and the corresponding grounded electrode 17. Therefore, even when the treatment target water W2 adheres to the support member 19 so as to be present as adhering water 22, stable electric discharge D is formed between the edge 18a of the high-voltage electrode 18 and the grounded electrode 17.

In contrast, in a high-voltage electrode unit 40 of the water treatment device according to the comparative example shown in FIG. 6B, the distance between each of edges 38a of a high-voltage electrode 38 and the corresponding grounded electrode 17 is approximately equal to the distance between each of support members 39 and the corresponding grounded electrode 17. In this case, if adhering water 22 is present on the support member 39, electric field is enhanced and local intense electric discharge LD is formed, between the adhering water 22 and the grounded electrode 17.

In a state where the grounded electrode and the high-voltage electrode are wetted with the treatment target water W2, a likelihood decreases with respect to irregularity in an electric discharge gap length. That is, localization of electric discharge due to irregularity in the electric discharge gap length becomes more likely to occur than in the case of gas-phase electric discharge. Since the water-treatment device 100 according to the present embodiment 1 is configured with the electrode portion capable of suppressing localization of electric discharge as compared to the comparative example, uniform electric discharge can be formed between the electrodes even in a situation where the grounded electrode 17 and the high-voltage electrode 18 are wetted with the treatment target water W2.

Next, a procedure of a water treatment method using the water treatment device 100 will be described with reference to FIG. 1. As a preparatory step, the electrode portion for forming the electric discharge region 21 is prepared inside the treatment tank 2. In the electrode portion, between the three flat sheet-shaped grounded electrodes 17 vertically disposed so as to be parallel to each other, the sheet-shaped high-voltage electrodes 18 each having the two edges 18a opposing the respective grounded electrodes 17 are disposed such that the distances between the edges 18a and the respective grounded electrodes 17 opposing thereto are equal to each other.

First, oxygen gas is supplied from the gas supply port 9 such that the inside of the treatment tank 2 is filled with a high-concentration oxygen atmosphere. The gas in the treatment tank 2 is discharged from the gas discharge port 10. Then, the pulsed power supply 12 is operated to apply pulsed high voltage to the high-voltage frame 14 and the high-voltage electrode units 20. Thus, the electric discharge D is generated to form the electric discharge region 21 between each edge 18a of the high-voltage electrode 18 and the corresponding grounded electrode 17.

Next, the untreated water W1 stored in the untreated water storing tank 1 is pumped up by the water supply pump 4, delivered through the water supply pipe 5 to the treatment tank 2, and sprinkled as the treatment target water W2 from the water sprinkling pipe 6. Much of the treatment target water W2 is dropped in a shower through the electric discharge region 21, and a portion of the treatment target water W2 adheres to any of the grounded electrodes 17 and is dropped in the form of a water film. The treatment target water W2 having passed through the electric discharge region 21 comes into contact with the electric discharge D, to be treated. Accordingly, organic compounds in the treatment target water W2 are oxidatively decomposed. The treatment target water W2 accumulated in the accumulation portion 2a at the bottom portion of the treatment tank 2 is delivered to the treated water storing tank 3 by the water discharge pump 7 and stored therein as the treated water W3.

A principle in which organic compounds in the treatment target water W2 are oxidatively decomposed in the treatment tank 2 of the water treatment device 100, will be described. Decomposition of organic compounds will be described here as an example, and ozone and OH radicals generated by electric discharge are known to be effective in disinfection, decolorization, and deodorization. By electric discharge, oxygen molecules ($O_2$) and water molecules ($H_2O$) in the treatment tank 2 impact high-energy electrons, and dissociation reactions in the following formula (1) and formula (2) occur. In formula (1) and formula (2), "e" represents electron, "O" represents atomic oxygen, "H" represents atomic hydrogen, and "OH" represents OH radical.

$$e + O_2 \rightarrow 2O \tag{1}$$

$$e + H_2O \rightarrow H + OH \tag{2}$$

Much of atomic oxygen generated in formula (1) becomes ozone ($O_3$) by a reaction in formula (3). In formula (3), "M" is a third body in the reaction and represents every molecule or atom in the air.

$$O + O_2 + M \rightarrow O_3 \tag{3}$$

Meanwhile, some of the OH radicals generated in formula (2) become hydrogen peroxide ($H_2O_2$) by a reaction in formula (4).

$$OH \pm OH \rightarrow H_2OH_2 \tag{4}$$

The oxidizing particles (O, OH, $O_3$, and $H_2O_2$) generated by the reactions in formula (1) to formula (4) cause, as in formula (5), organic compounds in the treatment target water W2 being dropped in the treatment tank 2 to oxidatively decompose into carbon dioxide ($CO_2$) and water. In formula (5), "R" represents the organic compounds to be decomposed.

$$R + (O, OH, O_3, H_2O_2) \rightarrow CO_2 + H_2O \tag{5}$$

Meanwhile, atomic oxygen and OH radicals not having reacted with the organic compounds in formula (5) become relatively long-live ozone and hydrogen peroxide as in formula (3) and formula (4). The ozone and the hydrogen peroxide are partially dissolved into the treatment target water W2 as in formula (6) and formula (7). In formula (6) and formula (7), "(liq.)" means liquid phase.

$$O_3 \rightarrow O_3 \text{ (liq.)} \tag{6}$$

$$H_2O_2 \rightarrow H_2O_2 \text{ (liq.)} \tag{7}$$

Furthermore, $O_3$ (liq.) and $H_2$ (liq.) undergo a reaction in the water so as to generate OH radicals, as in formula (8).

$$O_3 \text{ (liq.)} + H_2O_2 \text{ (liq.)} \rightarrow OH \text{ (liq.)} \tag{8}$$

$O_3$ (liq.), $H_2O_2$ (liq.), and OH (liq.) generated in the above formula (6) to formula (8) undergo a reaction in the water so as to cause the organic compounds in the treatment target water W2 to decompose, as in the following formula (9).

$$R + (O_3 \text{ (liq.)}, H_2O_2 \text{ (liq.)}, OH \text{ (liq.)}) \rightarrow CO_2 + H_2O \tag{9}$$

As described above, the decomposition of the organic compounds in the treatment target water W2 inside the treatment tank 2 of the water treatment device 100 progresses as both: decomposition, as in formula (5), of the organic compounds by the oxidizing particles that are present in the air; and decomposition, as in formula (9), of the organic compounds by the oxidizing particles that are present in the water.

The grounded electrodes 17, the high-voltage electrodes 18, and the support members 19 composing the electrode portion of the water treatment device 100 are suitably made of a metal material having excellent corrosion resistance, such as stainless steel or titanium. However, the electrode material may be a metal material other than the above-described metal material or an electrically conductive carbon material. If the support members 19 are made of an electrically conductive material, voltage is applied to the entire high-voltage electrode unit 20 by supplying power to one portion of the high-voltage electrode unit 20.

Likewise, each of the high-voltage frame 14 and the grounded frame 15 are also suitably made of an electrically conductive material such as stainless steel or titanium. Accordingly, voltage is applied to all the high-voltage electrode units 20 by supplying power to one portion of the high-voltage frame 14. In addition, all the grounded electrodes 17 are grounded by grounding one portion of the grounded frame 15.

The electrode portion only has to include at least two flat sheet-shaped grounded electrodes 17 and one set of high-voltage electrode unit 20. The number of grounded electrodes 17 and the intervals therebetween, and the number of high-voltage electrodes 18 included in the high-voltage electrode unit 20 and the intervals therebetween, may be changed as appropriate according to: the flow rate of the treatment target water W2; the components contained in the treatment target water W2; the concentrations thereof; or the like. The number of support members 19 and the intervals therebetween, and the like, may be changed as appropriate according to the lengths, the shapes, the stiffnesses, or the like of the high-voltage electrodes 18. For example, in a case where the high-voltage electrodes 18 are difficult to deform, only both ends in the longitudinal direction of the high-voltage electrodes 18 may be supported by support members 19.

In the present embodiment 1, the portions described as being horizontal or vertical do not necessarily have to be completely horizontal or vertical, and may be slightly angled with respect to the horizontal direction or the vertical direction within such a range as not to impair the advantageous effects of the present disclosure. For example, the support members 19 do not necessarily have to be disposed so as to vertically stand. In addition, the sheet-shaped high-voltage electrodes 18 do not necessarily have to be horizontally supported, and may be tilted in a longitudinal direction or a width direction. In addition, although each grounded electrode 17 and each high-voltage electrode unit 20 are disposed so as to respectively stand upward from the grounded frame 15 and the high-voltage frame 14 in the present embodiment 1, a configuration may be employed in which: at least one of the high-voltage frame 14 and the grounded frame 15 is disposed above the high-voltage electrode unit 20 or the grounded electrode 17; and at least one of the grounded electrode 17 and the high-voltage electrode unit 20 is suspended. In this case as well, the high-voltage electrodes 18 are supported by the support members 19 in the same manner as in the present embodiment 1.

Although the water sprinkling pipe 6 is used as the water sprinkling portion in the present embodiment 1, the water sprinkling portion only has to have a mechanism that enables the treatment target water W2 to be sprinkled in the form of liquid droplets into the treatment tank 2, and the water sprinkling portion may be a nozzle or a shower plate. In addition, the power supply is not limited to the pulsed power supply 12 and may be an AC power supply or a DC power supply as long as electric discharge can be stably formed.

The polarity of the voltage to be outputted from the pulsed power supply 12, a voltage peak value, a repetition frequency, a pulse width, and the like may be determined as appropriate according to various conditions such as an electrode structure and a gas type. In general, the voltage peak value is desirably 1 kV to 50 kV. The reason is as follows. If the voltage peak value is less than 1 kV, stable electric discharge is not formed, whereas, if the voltage peak value is greater than 50 kV, the power supply is upsized and electrical insulation becomes difficult to achieve, resulting in significant increase in cost.

The repetition frequency is desirably not less than 10 pps (pulse-per-second) and not greater than 100 kpps. The reason is as follows. If the repetition frequency is less than 10 pps, a very high voltage is needed for applying sufficient electric discharge power, whereas, if the repetition frequency is greater than 100 kpps, the efficiency of the water treatment decreases. The voltage, the pulse width, and the pulse repetition frequency may also be adjusted according to conditions such as the components of the treatment target water W2 or the concentrations thereof, or the flow rate of the treatment target water W2.

In the water treatment device 100 according to the present embodiment 1, the high-voltage electrodes 18 each have the shape of a sheet and thus are less likely to be broken than conventional wire-shaped high-voltage electrodes. In addition, the high-voltage electrodes 18 are supported by the plurality of support members 19, and thus, even if any of the high-voltage electrodes 18 is broken, the high-voltage electrode 18 is inhibited from drooping from the connected portions thereof to come into contact with or come close to the treatment tank 2 or the grounded electrodes 17, whereby short circuiting and localization of electric discharge are less likely to occur. Accordingly, the frequency of repair of the electrode portion decreases, and thus a high operation rate of the device is obtained.

In addition, each sheet-shaped high-voltage electrode 18 having a higher stiffness than a wire-shaped high-voltage electrode is supported by the plurality of support members 19 and thus less likely to be deformed in the up/down direction and the horizontal direction. Therefore, the distance between each edge 18a of the high-voltage electrode 18 and the corresponding grounded electrode 17, i.e., the electric discharge gap length, can be easily set to be even in the longitudinal direction. Furthermore, even in a case where the treatment tank 2 is upsized, deformation of the high-voltage electrode 18 can be suppressed by increasing the number of support members 19.

In addition, the dimension in the longitudinal direction of the high-voltage electrode 18 is smaller than the dimension in the horizontal direction of the grounded electrode 17, and the high-voltage electrode 18 is not present at the positions that oppose the ends 17b of the grounded electrode 17, and thus localization of electric discharge due to electric field enhancement at the ends 17b of the grounded electrode 17 is suppressed. Furthermore, the distance S between each edge 18a of the high-voltage electrode 18 and the corresponding grounded electrode 17 is shorter than the distance L between each support member 19 and the corresponding grounded electrode 17, and thus, even in the situation where the grounded electrode 17 and the high-voltage electrode 18 are wetted with the treatment target water W2, uniform electric discharge is formed between the electrodes, and efficient water treatment is performed. Owing to these features, the present embodiment 1 makes it possible to obtain a water treatment device 100 having a high efficiency of water treatment and a high operation rate.

Embodiment 2

In the above-described embodiment 1, the electrode portion provided with the high-voltage electrode units 20 each including the plurality of rectangular high-voltage electrodes 18 has been described. In the present embodiment 2, various modifications of the electrode portion of the water treatment device will be described with reference to FIG. 7 to FIG. 10. The entire configuration of a water treatment device according to the present embodiment 2 is the same as that in the above-described embodiment 1, and thus FIG. 1 will be used again and description of each part is omitted.

Each high-voltage electrode 18 is formed so as to have a small thickness. Thus, electric fields are likely to be concentrated at ends thereof, and electric discharge can be formed at a relatively low application voltage. Accordingly, the pulsed power supply 12 can be made simple and inexpensive. However, if the thickness of the high-voltage electrode 18 is small, the high-voltage electrode 18 becomes likely to be bent. The thickness of the high-voltage electrode 18 can be determined as appropriate according to the electric discharge gap length or the feature of the pulsed power supply 12. In general, the thickness is suitably between 0.02 mm to 2.0 mm. If the thickness is smaller than 0.02 mm, a sufficient strength cannot be ensured, whereas, if the thickness is larger than 2.0 mm, sufficient electric field enhancement is not obtained, and a high voltage is needed for forming electric discharge.

Figure 7:
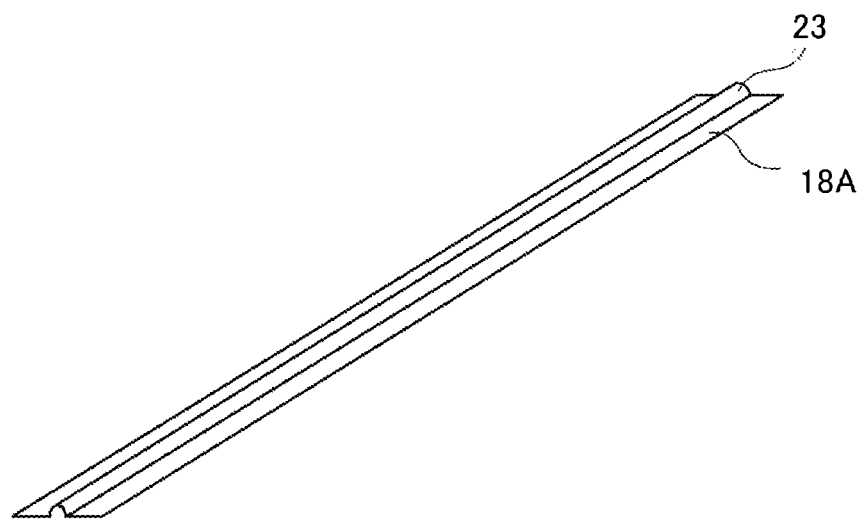
FIG. 7 is a perspective view of a high-voltage electrode of a water treatment device according to embodiment 2.

As shown in FIG. 7, a high-voltage electrode 18A has a bent portion 23 along the longitudinal direction. Thus, the high-voltage electrode 18A has a more improved bending strength and is less likely to be bent than the flat sheet-shaped high-voltage electrode 18. Therefore, the thickness of the high-voltage electrode 18A can be made smaller than that of the rectangular high-voltage electrode 18. The high-voltage electrode 18A shown in FIG. 7 has, at a portion thereof around the center in the width direction, a protrusion formed so as to extend in the longitudinal direction. However, the position, the shape, and the like of the bent portion are not limited thereto. For example, the high-voltage electrode 18A may be bent into the shape of a crank, and, in this case as well, the same advantageous effect is obtained. Although the method for forming the bent portion 23 is not particularly limited, press working allows mass production to be achieved at low cost.

Figure 8:
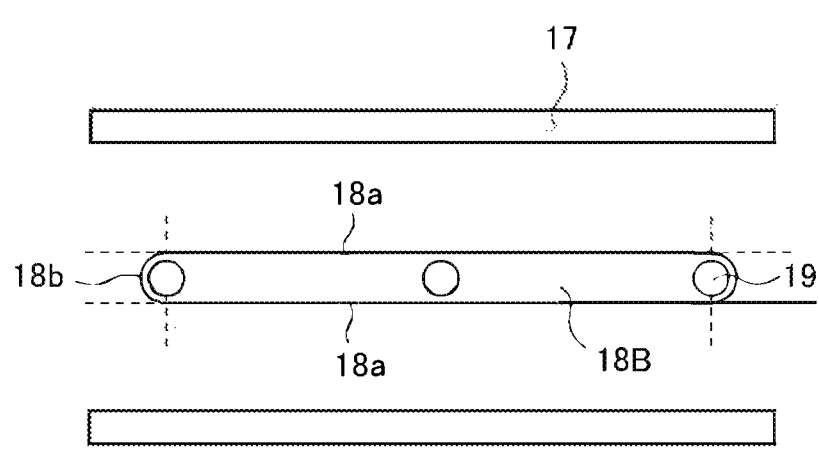
FIG. 8 is a top view of an electrode portion of the water treatment device according to embodiment 2.

Another modification of the electrode portion is shown in FIG. 8. A high-voltage electrode 18B has two longitudinal-direction edges 18b that connect the two edges 18a to each other. Each longitudinal-direction edge 18b has the shape of an arc. In the example shown in FIG. 8, both ends of the high-voltage electrode 18B are supported by columnar support members 19, and each longitudinal-direction edge 18b of the high-voltage electrode 18B has the shape of an arc along the corresponding support member 19.

In the case of the rectangular high-voltage electrode 18, electric fields are likely to be concentrated at the corners thereof, whereby electric discharge may be localized. In the case of prismatic support members 19 as well, electric fields are concentrated at the corners, whereby, particularly in the case of wetting with water, intense electric discharge may be locally formed between each support member 19 and the corresponding grounded electrode 17. If the support member 19 has a columnar shape and the longitudinal-direction edges 18b of the high-voltage electrode 18B each have the shape of an arc, electric field enhancement occurs at neither the support member 19 nor both ends of the high-voltage electrode 18B, and uniform electric discharge is formed between each edge 18a and the corresponding grounded electrode 17.

If the support member 19 is formed of a metal material, the potential is the same between the support member 19 and the high-voltage electrode 18B. Electric fields at both ends in the longitudinal direction of the high-voltage electrode 18B are relaxed by the support member 19 which is present such that each end is sandwiched from above and below. Accordingly, formation of local electric discharge at both ends in the longitudinal direction of the high-voltage electrode 18B is further suppressed. The high-voltage electrode 18, 18A, 18B may have a through hole (not shown). Accordingly, the amount of water to be accumulated at an upper portion of the high-voltage electrode 18, 18A decreases so that less load is applied to the high-voltage electrode 18, 18A, whereby deformation thereof in the vertical direction is suppressed.

Figure 9:
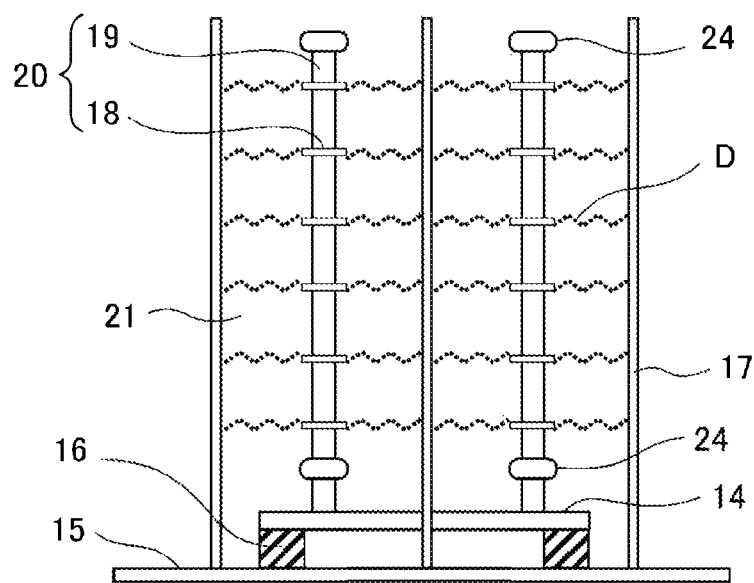
FIG. 9 is a side view of the electrode portion of the water treatment device according to embodiment 2.

FIG. 9 shows still another modification of the electrode portion. In each high-voltage electrode unit 20 shown in FIG. 9, electric field relaxing members 24 formed of an electrically conductive material are disposed above the uppermost one of the high-voltage electrodes 18 and below the lowermost one of the high-voltage electrodes 18, respectively. The length in the longitudinal direction of each electric field relaxing member 24 is equal to that of each high-voltage electrode 18.

Figure 10:
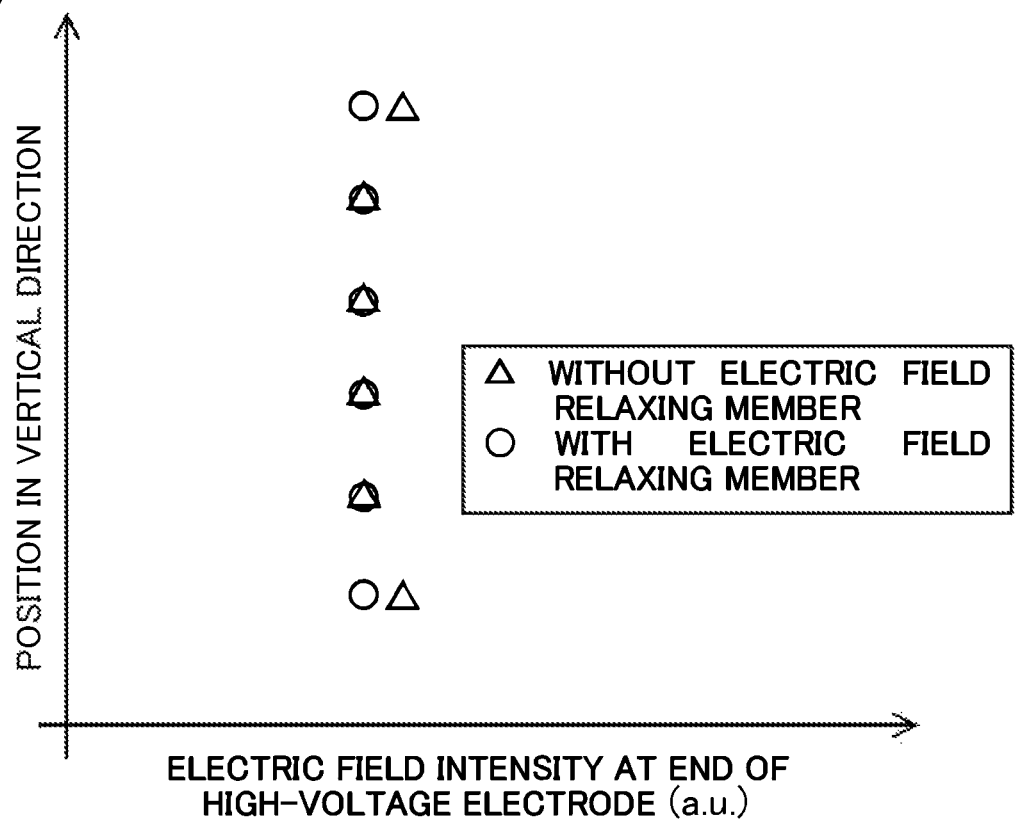
FIG. 10 is a diagram for explaining an advantageous effect of electric field relaxing members of the water treatment device according to embodiment 2.

Advantageous effects of the electric field relaxing member of the water treatment device will be described with reference to FIG. 10. In FIG. 10, the vertical axis indicates the position in the vertical direction of each high-voltage electrode, and the horizontal axis indicates the electric field intensity at an end of the high-voltage electrode. In FIG. 10, triangles indicate a case where the electric field relaxing members are not provided, and circles indicate a case where the electric field relaxing members 24 are provided. In the case where the electric field relaxing members 24 are not provided, the electric field intensities at the high-voltage electrodes 18 that are located at the uppermost and lowermost positions among the plurality of high-voltage electrodes 18 stacked in the vertical direction, are higher than the electric field intensities at the other high-voltage electrodes 18. This difference is caused by an electric field relaxing effect of closely located electrodes.

In the case where the electric field relaxing members 24 are not provided, the electric field at the uppermost one of the high-voltage electrodes 18 is relaxed only by the second uppermost one of the high-voltage electrodes 18, and the electric field at the lowermost one of the high-voltage electrodes 18 is relaxed only by the second lowermost one of the high-voltage electrodes 18. Meanwhile, the electric field at each high-voltage electrode 18 other than the uppermost and lowermost ones is relaxed by the high-voltage electrodes 18 that are adjacently located above and below said high-voltage electrode 18, and thus the electric field relaxing effect on said high-voltage electrode 18 is great. Therefore, in the case where the electric field relaxing members 24 are not provided, the electric fields at the uppermost and lowermost ones of the high-voltage electrodes 18 are relatively high, and electric discharge is likely to be concentrated thereat.

In contrast, if the electric field relaxing members 24 are provided above the uppermost one of the high-voltage electrodes 18 and below the lowermost one of the high-voltage electrodes 18 as shown in FIG. 9, the electric fields at the uppermost and lowermost ones of the high-voltage electrodes 18 are relaxed by the respective electric field relaxing members 24, and the electric fields at the uppermost and lowermost ones of the high-voltage electrodes 18 become the same level as the electric fields at the other high-voltage electrodes 18. Accordingly, electric discharge can be formed uniformly among all the high-voltage electrodes 18.

Each electric field relaxing member 24 is preferably formed of an electrically conductive material that has a larger thickness than each high-voltage electrode 18. Accordingly, although the potential at the electric field relaxing member 24 is the same as the potential at the high-voltage electrode 18, the electric field intensity at each end of the electric field relaxing member 24 is lower than the electric field intensity at the high-voltage electrode 18. Therefore, electric discharge is not generated between each edge of the electric field relaxing member 24 and the corresponding grounded electrode 17, and an electric field relaxing effect on only the adjacent high-voltage electrode 18 can be exhibited.

The position in the vertical direction of the electric field relaxing member 24, the width dimension thereof, and the like can be designed as appropriate. In general, it is preferable that: the distance between each electric field relaxing member 24 and the high-voltage electrode 18 adjacent thereto is set to be equal to the distance between the high-voltage electrodes 18; and the width dimension of the electric field relaxing member 24 is set to be equal to the width dimension of the high-voltage electrode 18. According to the present embodiment 2, further uniform electric discharge can be formed, and the efficiency of water treatment is improved.

Embodiment 3

Figure 11:
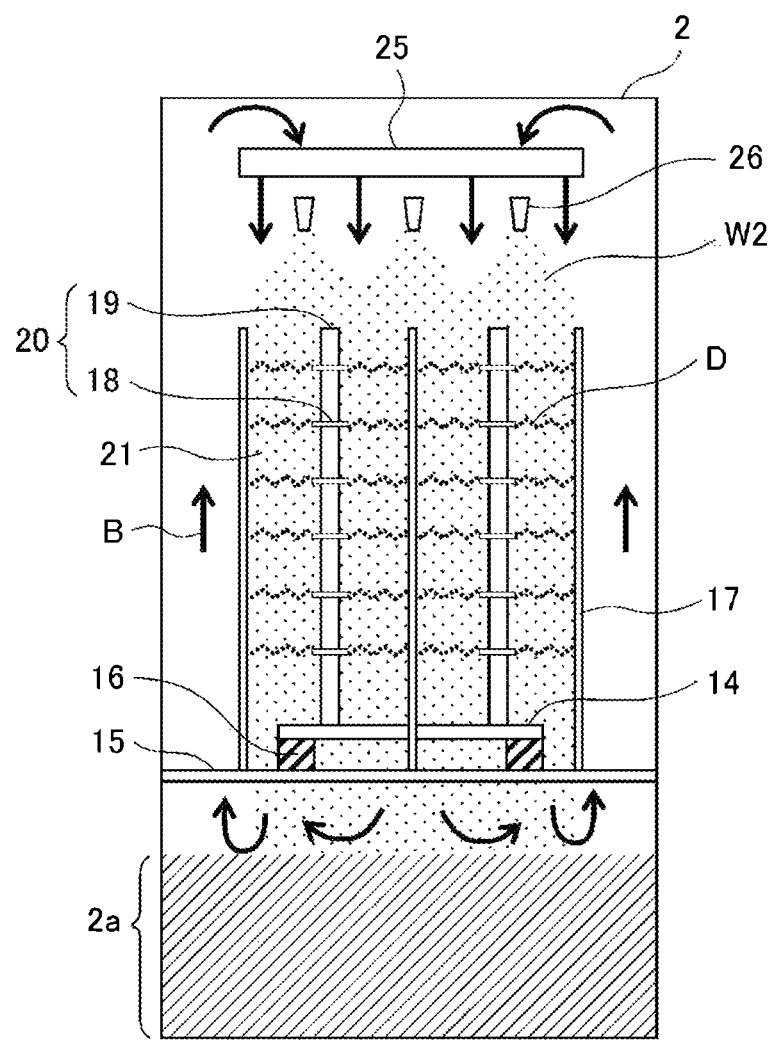
FIG. 11 is a schematic diagram showing a configuration of a treatment tank of a water treatment device according to embodiment 3.

FIG. 11 shows a treatment tank of a water treatment device according to embodiment 3. The water treatment device according to the present embodiment 3 includes, inside the treatment tank 2, an air blower 25 serving as air blowing means. The entire configuration of the water treatment device according to the present embodiment 3 is the same as that in the above-described embodiment 1, and thus FIG. 1 will be used again and description of each part is omitted.

The water treatment device according to the present embodiment 3 includes, at upper portions of the inside of the treatment tank 2, a plurality of (in FIG. 11, three) nozzles 26 serving as the water sprinkling portion. The air blower 25 is disposed above the nozzles 26 and induces an airflow (indicated by the arrow B in FIG. 11) that intersects with the extension direction of the electric discharge D. As the air blower 25, a propeller fan, a sirocco fan, a cross flow fan, or the like that can form an airflow inside the treatment tank 2, is used. In the example shown in FIG. 11, the airflow moves downward through the electric discharge region 21, and then moves upward through the outer sides of the electric discharge region 21.

In the water treatment device, the treatment target water W2 may adhere to any of the high-voltage electrodes 18 and the grounded electrodes 17, and electric discharge may become unstable. In the present embodiment 3, an airflow is formed in the treatment tank 2 by the air blower 25, and the treatment target water W2 having adhered to any of the high-voltage electrodes 18 and the grounded electrodes 17 is blown off, whereby electric discharge is inhibited from becoming unstable. In addition, a cooling effect of the airflow is exhibited, and thus the high-voltage electrodes 18 and the grounded electrodes 17 are inhibited from being excessively heated, whereby stable water treatment is performed.

The direction of the airflow to be induced by the air blower 25 is not limited to the direction shown in FIG. 11, and the airflow may be caused to move upward through the electric discharge region 21 by causing the air blower 25 to rotate in the opposite direction. In this case, the direction of the airflow and the direction of the dropping treatment target water W2 are opposite to each other, whereby an effect of promoting dissolution of oxidizing particles such as ozone in the air into the treatment target water W2, is obtained.

In addition, although the position of the air blower 25 inside the treatment tank 2 is preferably above the nozzles 26 since the air blower 25 at such a position would be prevented from being wetted with the treatment target water W2, said position is not limited thereto. The air blower 25 may be disposed near a side wall of the treatment tank 2. In this case as well, an airflow can be formed in the same manner. In addition, the air blower 25 is not limited to a propeller fan or the like, and a configuration in which a blower is provided outside the treatment tank 2 and connected to the treatment tank 2 via a duct, may be employed. According to the present embodiment 3, further stable water treatment can be performed in addition to the same advantageous effects as those in the above-described embodiment 1.

Embodiment 4

Figure 12:
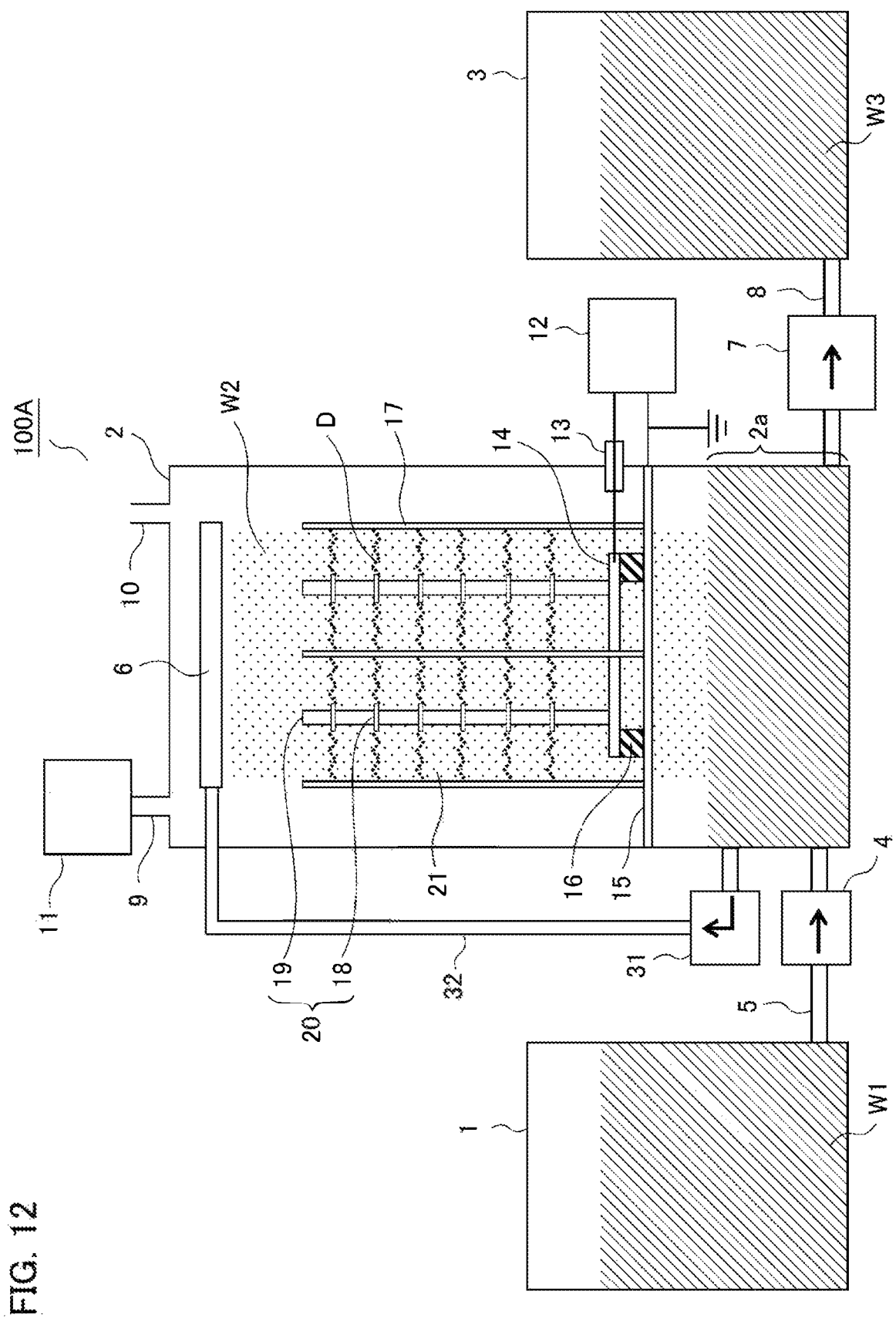
FIG. 12 is a schematic diagram showing the entire configuration of a water treatment device according to embodiment 4.

FIG. 12 shows the entire configuration of a water treatment device according to embodiment 4. A water treatment device 100A according to the present embodiment 4 includes a water circulation pump 31 and a water circulation pipe 32 serving as circulation means for drawing the treatment target water W2 out of the accumulation portion 2a at the bottom portion of the treatment tank 2 and delivering the treatment target water W2 to the water sprinkling pipe 6. The water supply pump 4 and the water supply pipe 5 serving as the untreated water delivery means deliver the untreated water W1 stored in the untreated water storing tank 1 to the accumulation portion 2a of the treatment tank 2. The other components are the same as those in the above-described embodiment 1, and thus description thereof is omitted.

In the above-described embodiment 1, the untreated water W1 stored in the untreated water storing tank 1 is delivered to the water sprinkling pipe 6 in the treatment tank 2 by the water supply pump 4 and the water supply pipe 5 (see FIG. 1). Meanwhile, in the present embodiment 4, the untreated water W1 is delivered to the accumulation portion 2a of the treatment tank 2 by the water supply pump 4 and the water supply pipe 5 and accumulated as the treatment target water W2 in the accumulation portion 2a. The treatment target water W2 accumulated in the accumulation portion 2a is delivered to the water sprinkling pipe 6 by the water circulation pump 31 and the water circulation pipe 32 and sprinkled from the water sprinkling pipe 6. The treatment target water W2 having passed through the electric discharge region 21 is accumulated in the accumulation portion 2a.

In a case where the concentration of the organic substances in the treatment target water W2 is high or the treatment target water W2 has a high persistent substance content, sufficient oxidative decomposition may not be achieved and the water treatment may not be completed by, as in the above-described embodiment 1, causing the treatment target water W2 to pass through the electric discharge region 21 in the treatment tank 2 just once. In such a case, the water treatment device 100A according to the present embodiment 4 enables the treatment target water W2 to be circulated in the treatment tank 2 a plurality of times, and thus a sufficient water treatment effect is obtained.

The flow rate of water to be supplied by the water supply pump 4, and the flow rate of water to be circulated by the water circulation pump 31, can be determined as appropriate according to the feature of the treatment target water W2. For example, the flow rates may be determined as follows. Reference values are respectively set for the concentration of the organic substances in, and the persistent substances substance content of, the untreated water W1, and, if either of the concentration of the organic substances in, and the persistent substance content of, the untreated water W1 exceeds the corresponding reference value, the flow rate of water to be supplied may be reduced, and the flow rate of water to be circulated may be increased. Accordingly, the treatment target water W2 passes through the electric discharge region 21 to come into contact with electric discharge a plurality of times by the time when the treatment target water W2 is discharged from the treatment tank 2. Thus, oxidative decomposition of the organic compounds or the persistent substances progresses.

Meanwhile, if either of the concentration of the organic substances in, and the persistent substance content of, the untreated water W1 is lower than the corresponding reference value, the flow rate of water to be supplied by the water supply pump 4 may be increased, and the treatment amount of the treatment target water W2 may be increased. Furthermore, the flow rate of water to be supplied and the flow rate of water to be circulated may also be changed according to variation in the feature of the treatment target water W2. Moreover, if the time average of the flow rate of water to be supplied by the water supply pump 4 and the time average of the flow rate of water to be discharged by the water discharge pump 7 are set to be equal to each other, continuous water treatment can be performed. According to the present embodiment 4, further stable water treatment can be performed on treatment target water W2 having a high concentration of the organic substances and a high persistent substance content, in addition to the same advantageous effects as those in the above-described embodiment 1.

Embodiment 5

Figure 13:
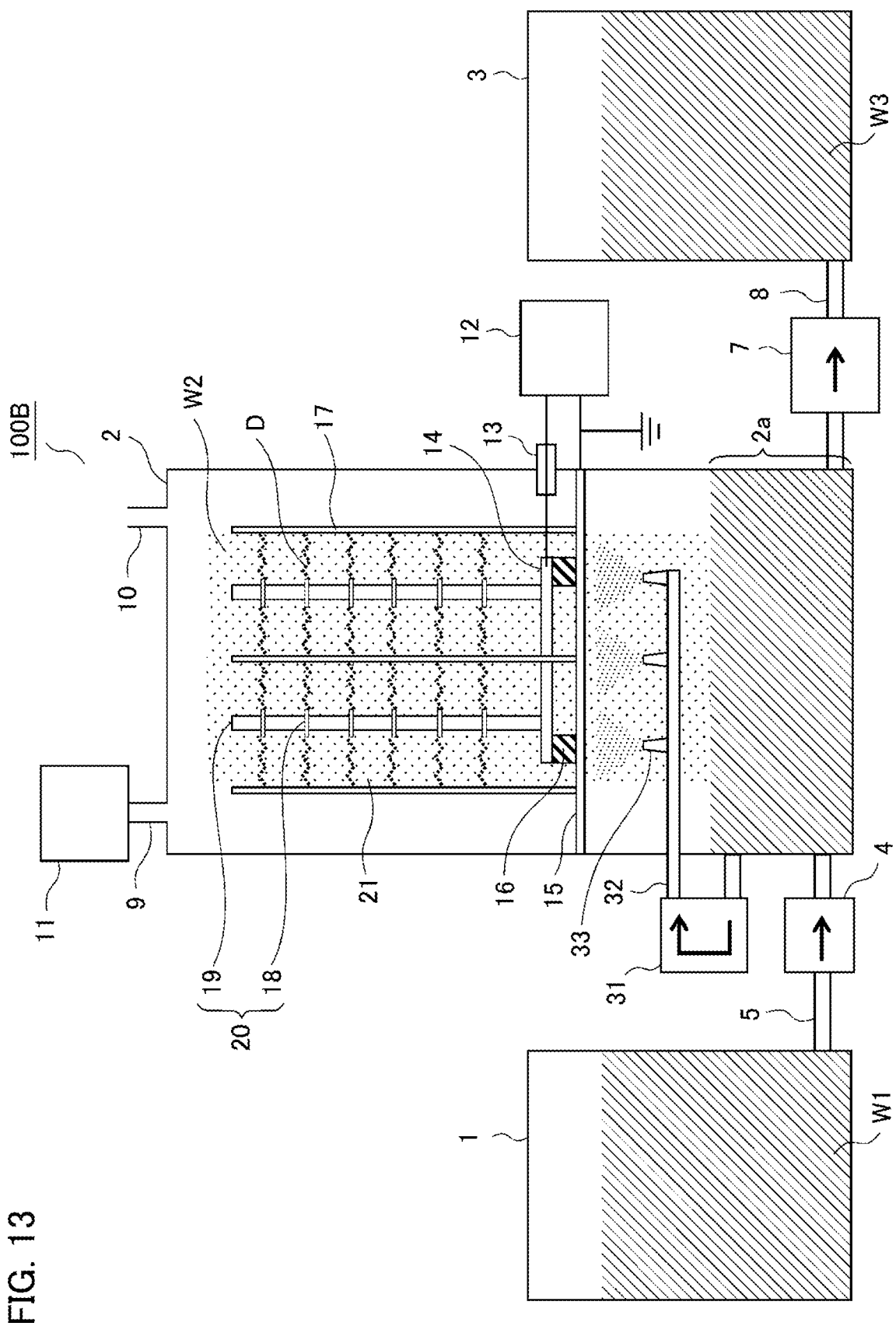
FIG. 13 is a schematic diagram showing the entire configuration of a water treatment device according to embodiment 5.

FIG. 13 shows the entire configuration of a water treatment device according to embodiment 5. A water treatment device 100B according to the present embodiment 5 includes a plurality of (in FIG. 13, three) injection nozzles 33 as the water sprinkling portion. The injection nozzles 33 are disposed at a lower portion of the inside of the treatment tank 2, and sprinkle the treatment target water W2 upward. The other components are the same as those in the above-described embodiment 1 and embodiment 4, and thus description thereof is omitted.

The injection nozzles 33 are disposed below the grounded electrodes 17 and the high-voltage electrodes 18 but above the surface of the treatment target water W2 accumulated in the accumulation portion 2a of the treatment tank 2. The accumulation portion 2a and the injection nozzles 33 are connected to each other by the water circulation pipe 32, and the water circulation pipe 32 is provided with the water circulation pump 31. The treatment target water W2 injected from the injection nozzles 33 passes through the electric discharge region 21 upward, and then moves downward through the electric discharge region 21 owing to gravity, to be dropped into the accumulation portion 2a. That is, the treatment target water W2 passes through the electric discharge region 21 to come into contact with the electric discharge D twice during one time of circulation. According to the present embodiment 5, the efficiency of water treatment is further improved in addition to the same advantageous effects as those in the above-described embodiment 4.

Embodiment 6

Figure 14:
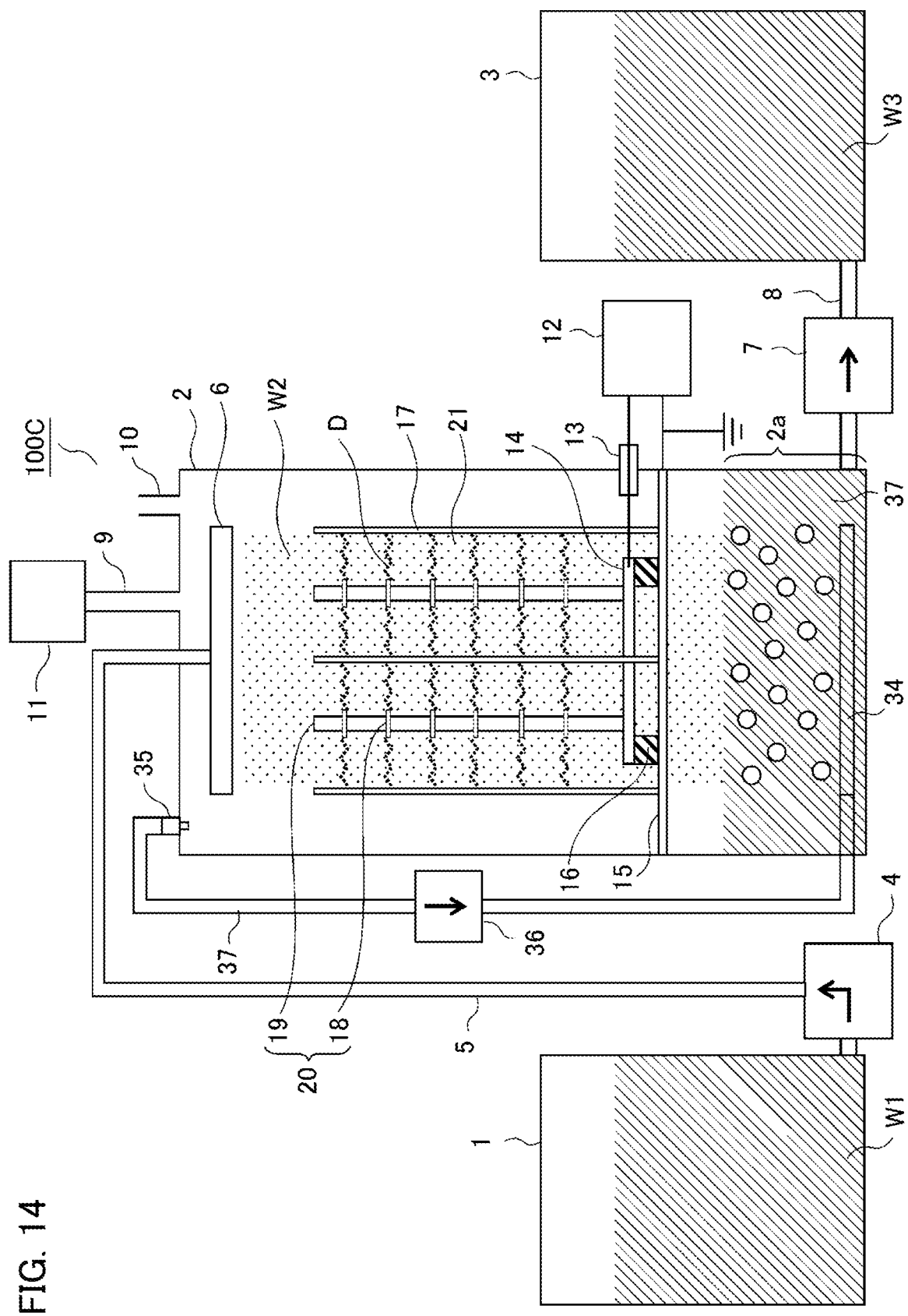
FIG. 14 is a schematic diagram showing the entire configuration of a water treatment device according to embodiment 6.

FIG. 14 shows the entire configuration of a water treatment device according to embodiment 6. A water treatment device 100C according to the present embodiment 6 includes: a gas diffusing pipe 34 serving as a gas diffusing member disposed in the accumulation portion 2a of the treatment tank 2; and a gas circulation pump 36 and a gas circulation pipe 37 serving as gas circulation means for suctioning gas inside the treatment tank 2 and supplying the gas to the gas diffusing pipe 34. The other components are the same as those in the above-described embodiment 1, and thus description thereof is omitted.

Operations of the gas circulation means of the water treatment device 100C will be described. The gas circulation pump 36 suctions gas inside the treatment tank 2 from a gas suctioning port 35 formed in the top of the treatment tank 2, and causes the gas to be injected from the gas diffusing pipe 34. Accordingly, ozone that is present in the treatment tank 2 is brought into contact with the treatment target water W2, and dissolution of ozone is promoted. Therefore, decomposition of the organic compounds is promoted as compared to a case where gas circulation is not performed.

Although the gas suctioning port 35 does not necessarily have to be formed in the top of the treatment tank 2, the gas suctioning port 35 is preferably disposed above the water sprinkling pipe 6 in order to prevent the treatment target water W2 from entering the gas circulation pump 36. Gas in the treatment tank 2 may be circulated by, instead of the gas circulation pump 36, air blowing means such as a blower.

Alternatively, the gas circulation means in the present embodiment 6 may be applied to the water treatment device 100B according to the above-described embodiment 5 so that each of gas and treatment target water W2 is circulated in the treatment tank 2. According to the present embodiment 6, the efficiency of water treatment is further improved in addition to the same advantageous effects as those in the above-described embodiment 1.

Although the disclosure is described above in terms of various exemplary embodiments, it should be understood that the various features, aspects and functionality described in one or more of the individual embodiments are not limited in their applicability to the particular embodiment with which they are described, but instead can be applied, alone or in various combinations to one or more of the embodiments of the disclosure. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 untreated water storing tank
2 treatment tank
2a accumulation portion
3 treated water storing tank
4 water supply pump
5 water supply pipe
6 water sprinkling pipe
7 water discharge pump
8 water discharge pipe
9 gas supply port
10 gas discharge port
11 gas supply source
12 pulsed power supply
13 insulating member
14 high-voltage frame
15 grounded frame
16 insulation retaining member
17 grounded electrode
17a flat surface portion
17b end
18, 18A, 18B, 28, 38 high-voltage electrode
18a, 38a edge
18b longitudinal-direction edge
19, 29, 39 support member
20, 30, 40 high-voltage electrode unit
21 electric discharge region
22 adhering water
23 bent portion
24 electric field relaxing member
25 air blower
26 nozzle
31 water circulation pump
32 water circulation pipe
33 injection nozzle
34 gas diffusing pipe
35 gas suctioning port
36 gas circulation pump
37 gas circulation pipe
100, 100A, 100B, 100C water treatment device

The invention claimed is:
1. A water treatment device comprising:
at least two grounded electrodes disposed inside a treatment tank so as to oppose each other;
a sheet-shaped high-voltage electrode disposed between the grounded electrodes;

a support member supporting the high-voltage electrode; and a water sprinkling portion which sprinkles treatment target water at least between the grounded electrodes, wherein the high-voltage electrode has two edges opposing the respective grounded electrodes and is disposed such that distances between the edges and the respective grounded electrodes opposing thereto are equal to each other, and electric discharge is generated to form an electric discharge region, between each grounded electrode and a corresponding edge of the high-voltage electrode, and treatment target water is caused to pass through the electric discharge region.

2. The water treatment device according to claim 1, wherein the
grounded electrodes each have a shape of a flat sheet and are vertically disposed so as to be parallel to each other.

3. The water treatment device according to claim 1, wherein the high-voltage electrode is horizontally supported by a plurality of the support member.

4. The water treatment device according to claim 1, wherein a plurality of the high-voltage electrodes are arranged at intervals from each other in a vertical direction and integrally supported by the support member.

5. The water treatment device according to claim 4, wherein electric field relaxing members each formed of an electrically conductive material are disposed above an uppermost one of the high-voltage electrodes and below a lowermost one of the high-voltage electrodes, respectively.

6. The water treatment device according to claim 1, wherein the support member has a prismatic shape or a columnar shape and is vertically disposed.

7. The water treatment device according to claim 1, wherein the support member supports at least both ends in a longitudinal direction of the high-voltage electrode.

8. The water treatment device according to claim 1, wherein a dimension in a longitudinal direction of the high-voltage electrode is smaller than a dimension in a horizontal direction of each grounded electrode.

9. The water treatment device according to claim 8, wherein the high-voltage electrode and the support member are, as seen from above, disposed on an inside of a rectangle, two sides of which are formed by the at least two grounded electrodes.

10. The water treatment device according to claim 1, wherein a distance between each edge of the high-voltage electrode and the corresponding grounded electrode is shorter than a distance between the support member and the at least two grounded electrodes.

11. The water treatment device according to claim 1, wherein the high-voltage electrode is a rectangular flat sheet.

12. The water treatment device according to claim 1, wherein the high-voltage electrode has a bent portion formed along a longitudinal direction thereof.

13. The water treatment device according to claim 1, wherein the high-voltage electrode has two longitudinal-direction edges connecting the two edges to each other, and each longitudinal-direction edge has a shape of an arc.

14. The water treatment device according to claim 1, wherein the water sprinkling portion is disposed at an upper portion of an inside of the treatment tank and sprinkles treatment target water downward.

15. The water treatment device according to claim 1, wherein the water sprinkling portion is disposed at a lower portion of an inside of the treatment tank and sprinkles treatment target water upward.

16. The water treatment device according to claim 1, the water treatment device further comprising an air blower inside the treatment tank, wherein the air blower induces an airflow that intersects with an extension direction of electric discharge.

17. The water treatment device according to claim 1, the water treatment device further comprising:
a water supply pump and a water supply pipe for delivering, to the water sprinkling portion, untreated water stored in an untreated water storing tank; and
a water discharge pump and a water discharge pipe for discharging treatment target water from an accumulation portion at a bottom portion of the treatment tank.

18. The water treatment device according to claim 1, the water treatment device further comprising:
a water supply pump and a water supply pipe for delivering, to the treatment tank, untreated water stored in an untreated water storing tank;
a water circulation pump and a water circulation pipe for drawing treatment target water out of an accumulation portion at a bottom portion of the treatment tank and delivering the treatment target water to the water sprinkling portion; and
a water discharge pump and a water discharge pipe for discharging treatment target water from the accumulation portion.

19. The water treatment device according to claim 17, the water treatment device further comprising:
a gas diffusing member disposed in the accumulation portion of the treatment tank; and
a gas circulation pump and a gas circulation pipe for suctioning gas inside the treatment tank and supplying the gas to the gas diffusing member.

20. A water treatment method comprising:
a step of disposing, between at least two flat sheet-shaped grounded electrodes vertically disposed so as to be parallel to each other, a sheet-shaped high-voltage electrode having two edges each opposing a respective grounded electrode, such that distances between the edges and the respective grounded electrodes opposing thereto are equal to each other,
a step of applying voltage to the high-voltage electrode so as to generate electric discharge to form an electric discharge region, between each grounded electrode and the corresponding edge of the high-voltage electrode; and
a step of sprinkling treatment target water between the grounded electrodes and causing the treatment target water to pass through the electric discharge region so as to bring the treatment target water into contact with the electric discharge, to treat the treatment target water.

* * * * *